United States Patent
Zhang et al.

(10) Patent No.: US 10,001,998 B2
(45) Date of Patent: Jun. 19, 2018

(54) DYNAMICALLY ENABLED BRANCH PREDICTION

(71) Applicant: Oracle International Corporation, Redwood City, CA (US)

(72) Inventors: Haowei Zhang, Sunnyvale, CA (US); Xiaoying Shen, Austin, TX (US); Manish Shah, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 393 days.

(21) Appl. No.: 14/256,347

(22) Filed: Apr. 18, 2014

(65) Prior Publication Data

US 2015/0301832 A1    Oct. 22, 2015

(51) Int. Cl.
  *G06F 15/00*    (2006.01)
  *G06F 7/38*     (2006.01)
  *G06F 9/00*     (2006.01)
  *G06F 9/44*     (2018.01)
  *G06F 9/38*     (2018.01)

(52) U.S. Cl.
  CPC .......... *G06F 9/3861* (2013.01); *G06F 9/3844* (2013.01); *G06F 9/3851* (2013.01)

(58) Field of Classification Search
  None
  See application file for complete search history.

(56) References Cited

U.S. PATENT DOCUMENTS

| | | | |
|---|---|---|---|
| 6,976,156 B1 | 12/2005 | Nguyen | |
| 7,103,757 B1 | 9/2006 | Kashyap | |
| 7,389,403 B1 * | 6/2008 | Alpert | G06F 9/3851 712/10 |
| 7,487,297 B2 | 2/2009 | El-Essawy et al. | |
| 7,627,742 B2 | 12/2009 | Bose et al. | |
| 8,555,040 B2 | 10/2013 | Beaumont-Smith et al. | |
| 8,572,581 B2 | 10/2013 | Shafi et al. | |
| 2003/0233642 A1 * | 12/2003 | Hank | G06F 8/433 717/156 |
| 2005/0141554 A1 * | 6/2005 | Hammarlund | G06F 9/5011 370/468 |
| 2008/0256345 A1 * | 10/2008 | Bose | G06F 1/3203 712/239 |
| 2010/0251160 A1 * | 9/2010 | Shafi | G06F 11/328 715/772 |
| 2011/0040995 A1 * | 2/2011 | Basak | G06F 1/3203 713/324 |
| 2011/0291748 A1 * | 12/2011 | Li | G06F 1/3228 327/544 |
| 2013/0173885 A1 * | 7/2013 | Watanabe | G06F 9/3806 712/205 |

\* cited by examiner

*Primary Examiner* — George Giroux

(74) *Attorney, Agent, or Firm* — Meyertons, Hood, Kivlin, Kowert & Goetzel, P.C.

(57) ABSTRACT

Embodiments for a processor that selectively enables and disables branch prediction are disclosed. The processor may include counters to track a number of fetched instructions, a number of branches, and a number of mispredicted branches. A misprediction threshold may be calculated dependent upon the tracked number of branches and a predefined misprediction ratio. Branch prediction may then be disabled when the number of mispredictions exceed the determined threshold value and dependent upon the branch rate.

17 Claims, 10 Drawing Sheets

DYNAMICALLY ENABLED BRANCH PREDICTION

BACKGROUND

Technical Field

This invention relates to integrated circuits, and more particularly, to techniques for implementing branch prediction within processors and processing cores.

Description of the Related Art

Computing systems typically include one or more processors or processing cores which are configured to execute program instructions. The program instructions may be stored in one of various locations within a computing system, such as, e.g., main memory, a hard drive, a CD-ROM, and the like. In some cases, a hierarchy of local memories or cache memories, may be employed to store frequently accessed program instructions and data.

When a processor or processing core retrieves a program instruction (commonly referred to as an "instruction fetch"), the processor or processing core issues a request via a communication bus to the device or memory where the desired program instruction is located. Each retrieved instruction may, in turn, determine the next instruction to be retrieved. Some program instructions contain conditional statements, such as, e.g., an if-then-else statement. When such an instruction is received by a processor or processing core, there are two possible sets of instructions (commonly referred to as "branches") that the processor or processing core may fetch from. Some processors and processing cores attempt to predict how the conditional will evaluate and fetch instructions accordingly. This process is typically referred to as "branch prediction."

Branch prediction may rely on a history of previous instructions that have been processed in order to predict the outcome of a conditional. Despite various methods and techniques, however, a predicted outcome may not be correct. In such cases, a processor or processing core may have fetched instructions that are not needed. When this occurs, the processor may discard the previously fetched instructions, and may wait while a proper set of instructions is retrieved from memory.

SUMMARY

Various embodiments of an apparatus and method for disabling branch prediction in a processor are disclosed. Broadly speaking, a method and an apparatus are contemplated in which a branch rate and a branch misprediction rate are determined. Branch prediction may be enabled responsive to a determination that the branch misprediction rate is less than or equal to a first threshold value. Branch prediction may be disabled responsive to a determination that the branch rate is less than or equal to a second threshold value and that the branch misprediction rate is greater than the first threshold value. Instructions may then be fetched responsive to a determination that branch prediction has been enabled.

In a non-limiting embodiment, branch prediction may be enabled responsive to the determination that that the branch misprediction rate is greater than the first threshold value and the branch rate is greater than or equal to the second threshold and to a determination that a processor is operating in a multi-thread mode. Branch prediction may be disabled responsive to the determination that that the branch misprediction rate is greater than the first threshold value and the branch rate is greater than or equal to the second threshold and to a determination that a processor is operating in a single thread mode.

In one implementation, a first counter may be configured to increment responsive to a fetch of a branch instruction. A second counter may be configured to increment responsive to a determination that a branch has been mispredicted. A third counter may be configured to increment responsive to an instruction being fetched and reset responsive to a determination that a value of the third counter is greater than a third threshold value. The first and second counters may be further configured to reset responsive to the determination that the value of the third counter is greater than the third threshold value.

In another non-limiting embodiment, the first threshold may be generated. A value of the second counter may be multiplied by a predetermined misprediction ratio to generate the first threshold value.

Figure 1:
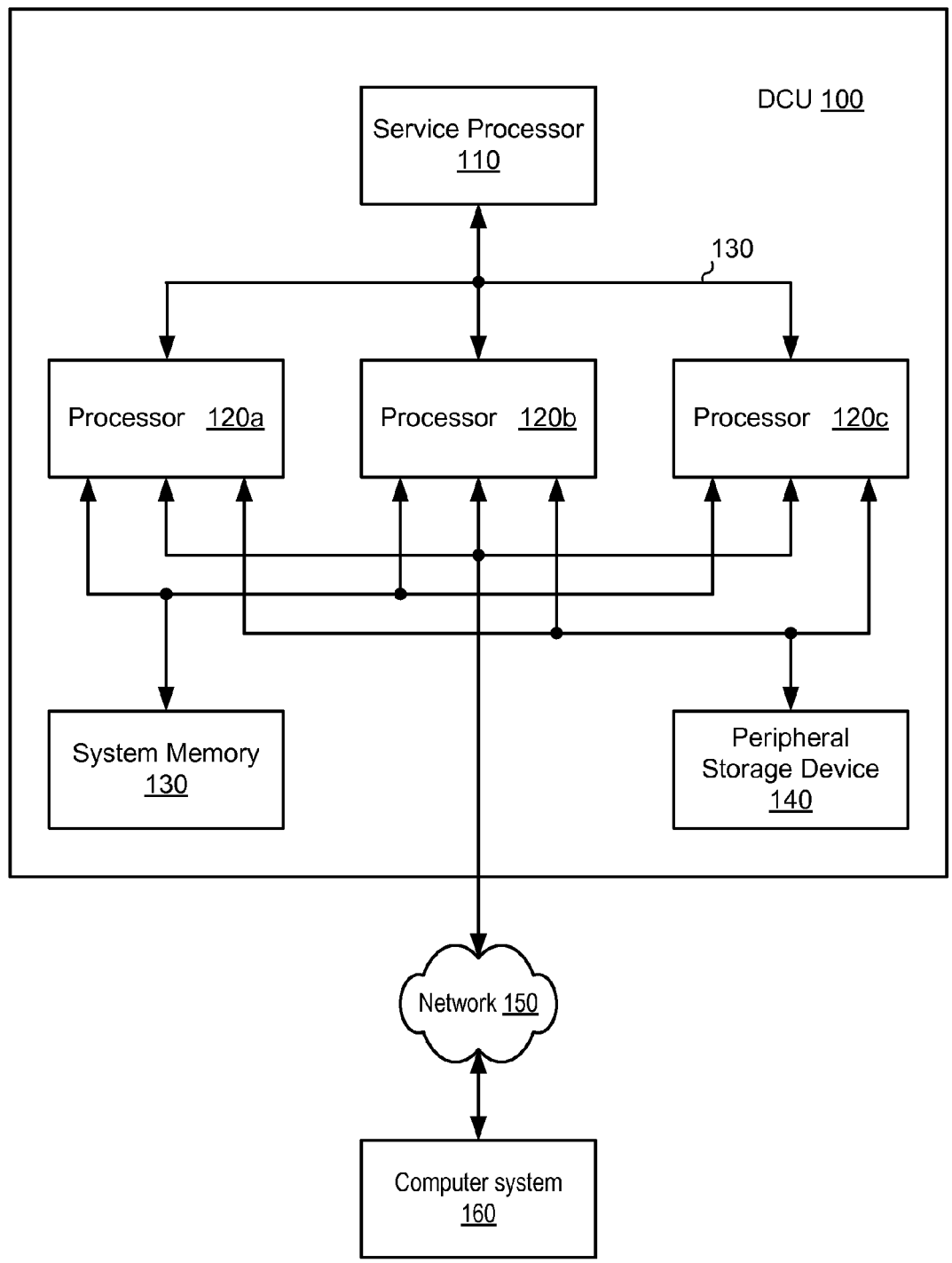
FIG. 1 is a block diagram of an embodiment of a distributed computing unit.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION OF EMBODIMENTS

In computing systems, program instructions executed by a processor or processing core may contain conditional statements. Each time a conditional is encountered, circuits within the processor or processing core attempt to predict the outcome of the conditional (commonly referred to as "branch prediction") before the actual evaluation of the conditional. Instructions are then fetched from the predicted branch in the hope that once the conditional is evaluated, subsequent instructions will already be ready in the pipeline of the processor or processing core.

In some cases, however, the prediction of which branch to fetch is incorrect (commonly referred to as a "misprediction"). When a misprediction occurs, the instructions that were fetched based on the prediction are flushed from the processing pipeline, and the instructions for correct branch are fetched. If a processor or processing core is consistently mispredicting which branch to fetch, power may be consumed fetching instructions that are not useful. The embodiments illustrated in the drawings and described below may provide techniques for enabling and disabling branch prediction to reduce power consumption.

A block diagram illustrating one embodiment of a distributed computing unit (DCU) 100 is shown in FIG. 1. In the illustrated embodiment, DCU 100 includes a service processor 110, coupled to a plurality of processors 120a-c through scalable system interface (SSI) 130. Processors 120a-c are in turn coupled to system memory 130, and peripheral storage device 140. DCU 100 is coupled to a network 150 which is in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. It is noted that although one system memory is shown, in various embodiments, any suitable number of system memories may be employed.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120a-c via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processors 120a-c, such as multi-media devices, graphics/display devices, standard input/output devices, etc.

In one embodiment, service processor 110 may include a field programmable gate array (FPGA) or an application specific integrated circuit (ASIC) configured to coordinate initialization and boot of processors 120a-c, such as from a power-on reset state. Additionally, in some embodiments, service processor 110 may include a programmable read-only memory (PROM) that may store instructions to perform a power-on self-test (POST). In various embodiments, service processor 110 may be configured to allow access to administrative functions such as test and debug modes of processors 120a-c, such as testing cache memories in processors 120a-c, or providing test code to processors 120a-c such that each of processors 120a-c may test their respective cache memories, for example.

As described in greater detail below, each of processors 120a-c may include one or more processing cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through SSI bus 130 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processing core.

Processor Overview

Figure 2:
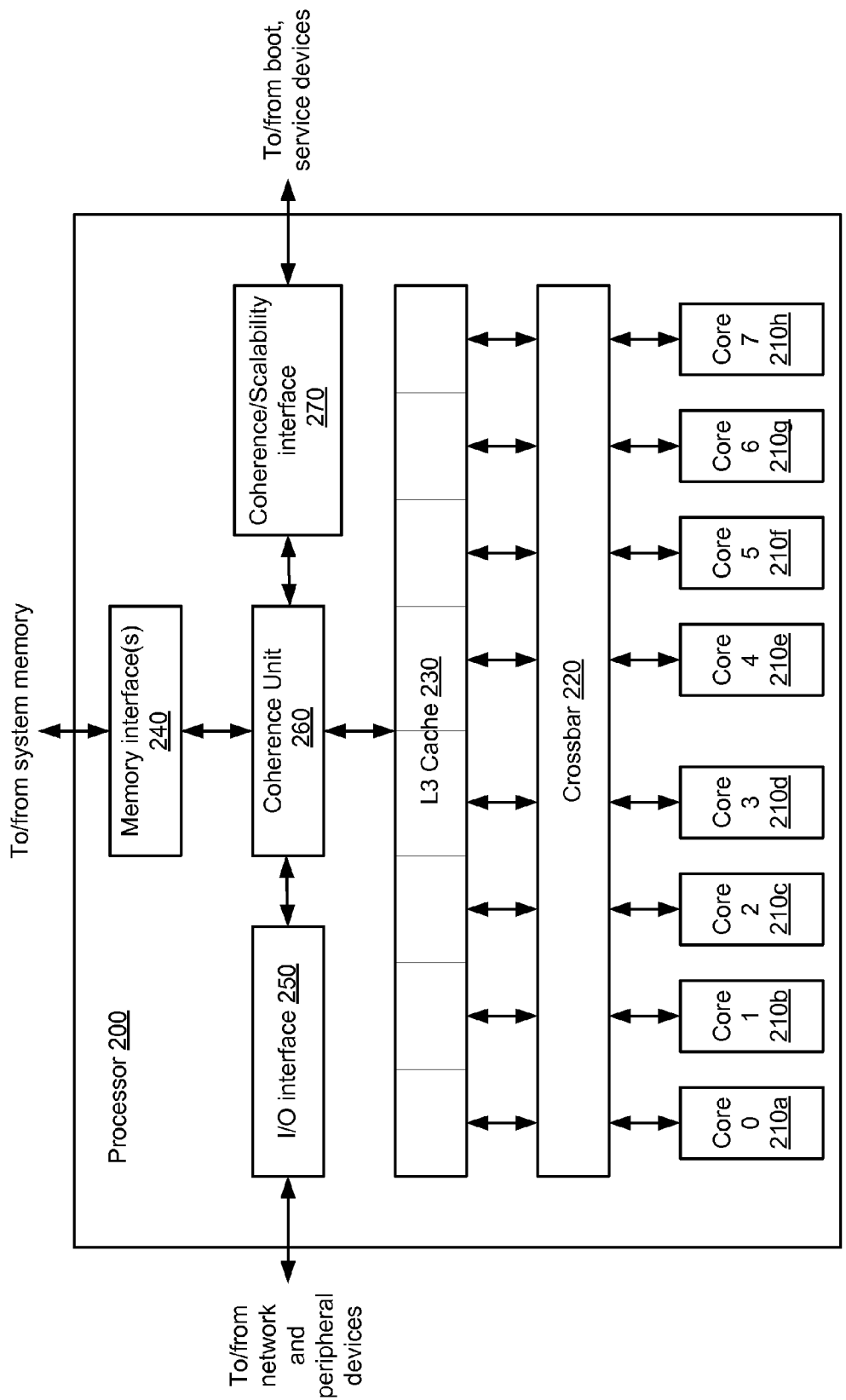
FIG. 2 is a block diagram of an embodiment of a processor.

A block diagram illustrating one embodiment of a multithreaded processor 200 is shown in FIG. 2. In some embodiments, processor 200 may correspond to processors 120a-c of DCU 100 in FIG. 1. In the illustrated embodiment, processor 200 includes a plurality of processing cores 210a-h, which are also designated "core 0" though "core 7." It is noted that although 8 cores are shown, in various embodiments, any suitable number of processing cores may be employed. Each of cores 210 is coupled to an L3 cache 230 via a crossbar 220. L3 cache 230 is coupled to coherence unit 260 which is in turn coupled to input/output (I/O) interface 250, and coherence/scalability interface 270. Additionally, coherence unit 260 is coupled to one or more memory interface(s) 240, which are coupled in turn to one or more banks of system memory (not shown). As described in greater detail below, I/O interface 250 may couple processor 200 to peripheral devices, and a network. Coherence/scalability interface 270 may couple processor 200 to boot and/or service devices such as, e.g., service processor 110 in DCU 100. In some embodiments, the elements included in processor 200 may be fabricated as part of a single integrated circuit (IC), for example on a single semiconductor die.

Cores 210 may be configured to execute instructions and to process data according to a particular instruction set architecture (ISA). In one embodiment, cores 210 may be configured to implement the SPARC® V9 ISA, although in other embodiments it is contemplated that any desired ISA may be employed, such as x86, PowerPC® or MIPS®, for example. In the illustrated embodiment, each of cores 210 may be configured to operate independently of the others, such that all cores 210 may execute in parallel. Additionally, in some embodiments each of cores 210 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 210 may also be referred to as a multithreaded (MT) core. In one embodiment, each of cores 210 may be configured to concurrently execute instructions from eight threads, for a total of 64 threads concurrently executing across processor 200. However, in other embodiments it is contemplated that other numbers of cores 210 may be provided, and that cores 210 may concurrently process different numbers of threads.

Crossbar 220 may be configured to manage data flow between cores 210 and the shared L3 cache 230. In one embodiment, crossbar 220 may include logic (such as multiplexers or a switch fabric, for example) that allows any core 210 to access any bank of L3 cache 230, and that conversely allows data to be returned from any L3 bank to any core 210. Crossbar 220 may be configured to concurrently process data requests from cores 210 to L3 cache 230 as well as data responses from L3 cache 230 to cores 210. In some embodiments, crossbar 220 may include logic to queue data requests and/or responses, such that requests and responses may not block other activity while waiting for service. Additionally, in one embodiment crossbar 220 may be configured to arbitrate conflicts that may occur when multiple cores 210 attempt to access a single bank of L3 cache 230.

L3 cache 230 may be configured to cache instructions and data for use by cores 210. In the illustrated embodiment, L3 cache 230 may be organized into eight separately addressable banks that may each be independently accessed, such that in the absence of conflicts, each bank may concurrently return data to a respective core 210. In some embodiments, each individual bank may be implemented using set-associative or direct-mapped techniques. For example, in one embodiment, L3 cache 230 may be a 48 megabyte (MB) cache, where each bank is 12-way set associative with a 64-byte line size, although other cache sizes and geometries are possible and contemplated. L3 cache 230 may be implemented in some embodiments as a writeback cache in which written (dirty) data may not be written to system memory until a corresponding cache line is evicted.

In some embodiments, L3 cache 230 may be configured to operate in a diagnostic mode that allows direct access to the cache memory. For example, in such a mode, L3 cache 230 may permit the explicit addressing of specific cache structures such as individual sets, banks, ways, etc., in contrast to a conventional mode of cache operation in which some aspects of the cache may not be directly selectable (such as, e.g., individual cache ways). The diagnostic mode may be implemented as a direct port to L3 cache 230 that may be used by, for example, service processor 110 to store data into L3 cache 230. Alternatively, crossbar 220 may be configured to allow direct access to L3 cache 230 by processing cores 210 or through network interface 270 or I/O interface 250.

L3 cache 230 may be further configured to implement a built-in self-test (BIST). An address generator, a test pattern generator, and a BIST controller may be included in L3 cache 230. The address generator, test pattern generator, and BIST controller may be implemented in hardware, software, or a combination thereof. The BIST may perform tests such as, e.g., checkerboard, walking 1/0, sliding diagonal, and the like, to determine that data storage cells within L3 cache 230 are capable of storing both a logical 0 and logical 1. In the case where the BIST determines that not all data storage cells within L3 cache 230 are functional, a flag or other signal may be sent to service processor 110 or one or more of processing cores 210 indicating that L3 cache 230 is faulty.

In some embodiments, L3 cache 230 may implement queues for requests arriving from and results to be sent to crossbar 220. Additionally, in some embodiments L3 cache 230 may implement a fill buffer configured to store fill data arriving from memory interface 240, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 230 may variously be implemented as single-ported or multiported (i.e., capable of processing multiple concurrent read and/or write accesses). In either case, L3 cache 230 may implement arbitration logic to prioritize cache access among various cache read and write requestors.

Memory interface 240 may be configured to manage the transfer of data between L3 cache 230 and system memory, for example in response to L3 fill requests and data evictions. In some embodiments, multiple instances of memory interface 240 may be implemented, with each instance configured to control a respective bank of system memory. Memory interface 240 may be configured to interface to any suitable type of system memory, such as described above in reference to FIG. 1 In some embodiments, memory interface 240 may be configured to support interfacing to multiple different types of system memory.

In the illustrated embodiment, processor 200 may also be configured to receive data from sources other than system memory. I/O interface 250 may be configured to provide a central interface for such sources to exchange data with cores 210 and/or L3 cache 230 via coherence unit 260. In some embodiments, I/O interface 250 may be configured to coordinate Direct Memory Access (DMA) transfers of data between external peripherals and system memory via coherence unit 260 and memory interface 240. In addition to coordinating access between crossbar 220 and other interface logic, in one embodiment I/O interface 250 may be configured to couple processor 200 to external boot and/or service devices. For example, initialization and startup of processor 200 may be controlled by an external device (such as, e.g., a FPGA) that may be configured to provide an implementation- or system-specific sequence of boot instructions and data. Such a boot sequence may, for example, coordinate reset testing, initialization of peripheral devices and initial execution of processor 200, before the boot process proceeds to load data from a disk or network device. Additionally, in some embodiments such an external device may be configured to place processor 200 in a debug, diagnostic, or other type of service mode upon request.

I/O interface 250 may be configured to coordinate data transfer between processor 200 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, I/O interface 250 may implement one or more instances of an interface such as Peripheral Component Interface Express (PCI Express™), although it is contemplated that any suitable interface standard or combination of standards may be employed. For example, in some embodiments I/O interface 250 may be configured to implement a version of Universal Serial Bus (USB) protocol or IEEE 1394 (Firewire®) protocol in addition to or instead of PCI Express™.

I/O interface 250 may also be configured to coordinate data transfer between processor 200 and one or more devices (e.g., other computer systems) coupled to processor 200 via a network. In one embodiment, I/O interface 250 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O interface 250 may be configured to implement multiple discrete network interface ports.

Core Overview

Figure 3:
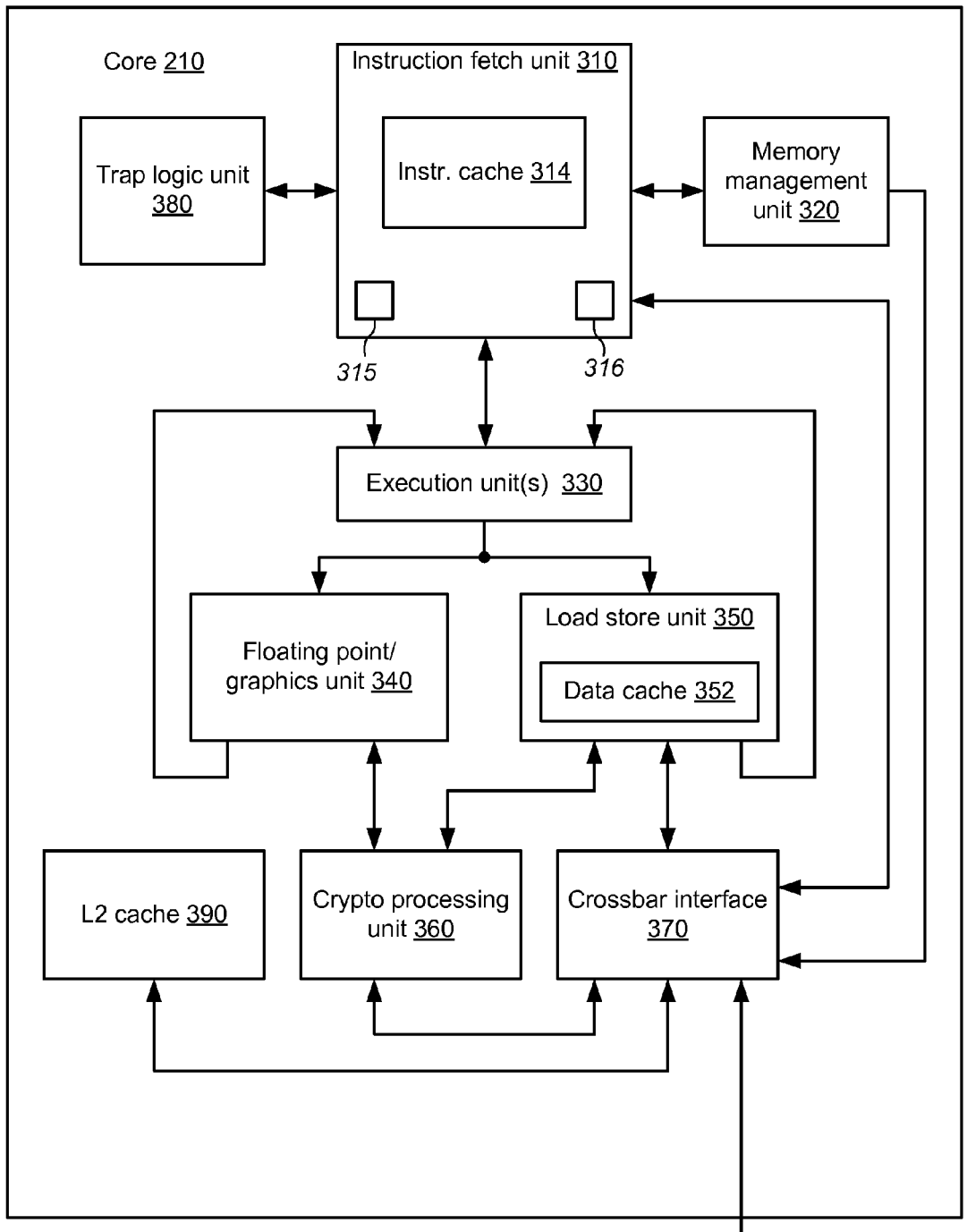
FIG. 3 is a block diagram of an embodiment of a processing core.

A possible embodiment of core 210 configured is illustrated in FIG. 3. In the illustrated embodiment, core 210 includes an instruction fetch unit (IFU) 310 coupled to a memory management unit (MMU) 320, a crossbar interface 370, a trap logic unit (TLU) 380, a L2 cache memory 390, and one or more of execution units 330. Execution unit 330 is coupled to both a floating point/graphics unit (FGU) 340 and a load store unit (LSU) 350. Each of the latter units is also coupled to send data back to each of execution units 330. Both FGU 340 and LSU 350 are coupled to a crypto processing unit 360. Additionally, LSU 350, crypto processing unit 360, L2 cache memory 390 and MMU 320 are coupled to crossbar interface 370, which may in turn be coupled to crossbar 220 shown in FIG. 2.

Instruction fetch unit 310 may be configured to provide instructions to the rest of core 210 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 further includes an instruction cache 314. In one embodiment, IFU 310 may include logic to maintain fetch addresses (e.g., derived from program counters) corresponding to each thread being executed by core 210, and to coordinate the retrieval of instructions from instruction cache 314 according to those fetch addresses. Additionally, in some embodiments IFU 310 may include logic to predict branch outcomes and/or fetch target addresses, such as a Branch History Table (BHT), Branch Target Buffer (BTB), or other suitable structure, for example.

IFU 310 may also include one or more counters 315. Counters 315 may be configured to increment in response to various events, such as, e.g., a new instruction being fetched, the occurrence of a branch, and the like. Counters as described herein, may be a sequential logic circuit configured to cycle through a pre-determined set of logic states. A counter may include one or more state elements such as, e.g., flip-flop circuits, and may be designed according to one of various designs styles including asynchronous (ripple counters), synchronous counters, ring counters, and the like.

Branch control circuitry 316 is also included in IFU 310. In various embodiments, branch control circuitry 316 may be configured to calculate branch rate and branch misprediction rate over a predetermined number of new instructions fetches. Branch control circuitry 316 may be used the calculated branch rate and branch misprediction rate to selectively enable and disable branch prediction within core 210. In some embodiments, power may be conserved by not performing fetches along a predicted branch when the rate of branch mispredictions is high.

If core 210 is configured to execute only a single processing thread and branch prediction is disabled, fetches for the thread may be stalled when a branch is reached until the branch is resolved. Once the branch is evaluated, fetches may resume. In cases where core 210 is capable of executing more than one thread and branch prediction is disabled, a thread that encounters a branch may yield or reallocate its fetch slots to another execution thread until the branch is resolved. In such cases, an improvement in processing efficiency may be realized. In both single and multi-threaded modes of operation, circuitry related to branch prediction may still operate even through the branch prediction mode is disabled, thereby allowing the continued gathering of data regarding numbers of branches and the number of mispredictions over a predetermined period. Using data from the branch circuitry and counters 315, branch control circuitry 316 may re-enable branch prediction dependent upon the calculated rates of branches and branch mispredictions.

In one embodiment, IFU 310 may be configured to maintain a pool of fetched, ready-for-issue instructions drawn from among each of the threads being executed by core 210. For example, IFU 310 may implement a respective instruction buffer corresponding to each thread in which several recently-fetched instructions from the corresponding thread may be stored. In some embodiments, IFU 310 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups).

In some embodiments, IFU 310 may be configured to further prepare instructions for execution, for example by decoding instructions, detecting scheduling hazards, arbitrating for access to contended resources, or the like. Moreover, in some embodiments, instructions from a given thread may be speculatively issued from IFU 310 for execution. For example, a given instruction from a certain thread may fall in the shadow of a conditional branch instruction from that same thread that was predicted to be taken or not-taken, or a load instruction from that same thread that was predicted to hit in data cache 352, but for which the actual outcome has not yet been determined. In such embodiments, after receiving notice of a misspeculation such as a branch misprediction or a load miss, IFU 310 may be configured to cancel misspeculated instructions from a given thread as well as issued instructions from the given thread that are dependent on or subsequent to the misspeculated instruction, and to redirect instruction fetch appropriately.

Execution unit 330 may be configured to execute and provide results for certain types of instructions issued from IFU 310. In one embodiment, execution unit 330 may be configured to execute certain integer-type instructions defined in the implemented ISA, such as arithmetic, logical, and shift instructions. It is contemplated that in some embodiments, core 210 may include more than one execution unit 330, and each of the execution units may or may not be symmetric in functionality. Finally, in the illustrated embodiment instructions destined for FGU 340 or LSU 350 pass through execution unit 330. However, in alternative embodiments it is contemplated that such instructions may be issued directly from IFU 310 to their respective units without passing through execution unit 330.

Floating point/graphics unit 340 may be configured to execute and provide results for certain floating-point and graphics-oriented instructions defined in the implemented ISA. For example, in one embodiment FGU 340 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 340 may implement partitioned-arithmetic and graphics-oriented instructions defined by a version of the SPARC® Visual Instruction Set (VIS™) architecture, such as VIS™ 2.0. Additionally, in one embodiment FGU 340 may implement certain integer instructions such as integer multiply, divide, and population count instructions, and may be configured to perform multiplication operations on behalf of stream processing unit 240. Depending on the implementation of FGU 360, some instructions (e.g., some transcendental or extended-precision instructions) or instruction operand or result scenarios (e.g., certain abnormal operands or expected results) may be trapped and handled or emulated by software.

In the illustrated embodiment, FGU 340 may be configured to store floating-point register state information for each thread in a floating-point register file. In one embodiment, FGU 340 may implement separate execution pipelines for floating point add/multiply, divide/square root, and graphics operations, while in other embodiments the instructions implemented by FGU 340 may be differently partitioned. In various embodiments, instructions implemented by FGU 340 may be fully pipelined (i.e., FGU 340 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 350 may be configured to process data memory references, such as integer and floating-point load and store instructions as well as memory requests that may originate from stream processing unit 360. In some embodiments, LSU 350 may also be configured to assist in the processing of instruction cache 314 misses originating from IFU 310. LSU 350 may include a data cache 352 as well as logic configured to detect cache misses and to responsively request data from L3 cache 230 via crossbar interface 370. In one embodiment, data cache 352 may be configured as a write-through cache in which all stores are written to L3 cache 230 regardless of whether they hit in data cache 352; in some such embodiments, stores that miss in data cache 352 may cause an entry corresponding to the store data to be allocated within the cache. In other embodiments, data cache 352 may be implemented as a write-back cache.

In one embodiment, LSU 350 may include a miss queue configured to store records of pending memory accesses that have missed in data cache 352 such that additional memory accesses targeting memory addresses for which a miss is pending may not generate additional L3 cache request traffic. In the illustrated embodiment, address generation for a load/store instruction may be performed by one of EXUs 330. Depending on the addressing mode specified by the instruction, one of EXUs 330 may perform arithmetic (such as adding an index value to a base value, for example) to yield the desired address. Additionally, in some embodiments LSU 350 may include logic configured to translate virtual data addresses generated by EXUs 330 to physical addresses, such as a Data Translation Lookaside Buffer (DTLB).

Crypto processing unit 360 may be configured to implement one or more specific data processing algorithms in hardware. For example, crypto processing unit 360 may include logic configured to support encryption/decryption algorithms such as Advanced Encryption Standard (AES), Data Encryption Standard/Triple Data Encryption Standard (DES/3 DES), or Ron's Code #4 (RC4). Crypto processing unit 240 may also include logic to implement hash or checksum algorithms such as Secure Hash Algorithm (SHA-1, SHA-256), Message Digest 5 (MD5), or Cyclic Redundancy Checksum (CRC). Crypto processing unit 360 may also be configured to implement modular arithmetic such as modular multiplication, reduction and exponentiation. In one embodiment, crypto processing unit 360 may be configured to utilize the multiply array included in FGU 340 for modular multiplication. In various embodiments, crypto processing unit 360 may implement several of the aforementioned algorithms as well as other algorithms not specifically described.

Crypto processing unit 360 may be configured to execute as a coprocessor independent of integer or floating-point instruction issue or execution. For example, in one embodiment crypto processing unit 360 may be configured to receive operations and operands via control registers accessible via software; in the illustrated embodiment crypto processing unit 360 may access such control registers via LSU 350. In such embodiments, crypto processing unit 360 may be indirectly programmed or configured by instructions issued from IFU 310, such as instructions to read or write control registers. However, even if indirectly programmed by such instructions, crypto processing unit 360 may execute independently without further interlock or coordination with IFU 310. In another embodiment crypto processing unit 360 may receive operations (e.g., instructions) and operands decoded and issued from the instruction stream by IFU 310, and may execute in response to such operations. That is, in such an embodiment crypto processing unit 360 may be configured as an additional functional unit schedulable from the instruction stream, rather than as an independent coprocessor.

In some embodiments, crypto processing unit 360 may be configured to freely schedule operations across its various algorithmic subunits independent of other functional unit activity. Additionally, crypto processing unit 360 may be configured to generate memory load and store activity, for example to system memory. In the illustrated embodiment, crypto processing unit 360 may interact directly with crossbar interface 370 for such memory activity, while in other embodiments crypto processing unit 360 may coordinate memory activity through LSU 350. In one embodiment, software may poll crypto processing unit 360 through one or more control registers to determine result status and to retrieve ready results, for example by accessing additional control registers. In other embodiments, FGU 340, LSU 350 or other logic may be configured to poll crypto processing unit 360 at intervals to determine whether it has results that are ready to write back. In still other embodiments, crypto processing unit 360 may be configured to generate a trap when a result is ready, to allow software to coordinate result retrieval and processing.

L2 cache memory 390 may be configured to cache instructions and data for use by execution unit 330. In the illustrated embodiment, L2 cache memory 390 may be organized into multiple separately addressable banks that may each be independently accessed. In some embodiments, each individual bank may be implemented using set-associative or direct-mapped techniques.

L2 cache memory 390 may be implemented in some embodiments as a writeback cache in which written (dirty) data may not be written to system memory until a corresponding cache line is evicted. L2 cache memory 390 may variously be implemented as single-ported or multiported (i.e., capable of processing multiple concurrent read and/or write accesses). In either case, L2 cache memory 390 may implement arbitration logic to prioritize cache access among various cache read and write requestors.

In some embodiments, L2 cache memory 390 may be configured to operate in a diagnostic mode that allows direct access to the cache memory. For example, in such a mode, L2 cache memory 390 may permit the explicit addressing of specific cache structures such as individual sets, banks, ways, etc., in contrast to a conventional mode of cache operation in which some aspects of the cache may not be directly selectable (such as, e.g., individual cache ways). The diagnostic mode may be implemented as a direct port to L2 cache memory 390. Alternatively, crossbar interface 370 or MMU 320 may be configured to allow direct access to L2 cache memory 390 via the crossbar interface.

L2 cache memory 390 may be further configured to implement a BIST. An address generator, a test pattern generator, and a BIST controller may be included in L2 cache memory 390. The address generator, test pattern generator, and BIST controller may be implemented in hardware, software, or a combination thereof. The BIST may perform tests such as, e.g., checkerboard, walking 1/0, sliding diagonal, and the like, to determine that data storage cells within L2 cache memory 390 are capable of storing both a logical 0 and logical 1. In the case where the BIST determines that not all data storage cells within L2 cache memory 390 are functional, a flag or other signal may be activated indicating that L2 cache memory 390 is faulty.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 314 or data cache 352. In the event no translation for a given virtual page number is found in the appropriate TLB, memory management unit 320 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 320 is unable to derive a valid address translation, for example if one of the memory pages including a necessary page table is not resident in physical memory (i.e., a page miss), MMU 320 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 210 may be configured to generate off-core memory or I/O requests. For example, IFU 310 or LSU 350 may generate access requests to L3 cache 230 in response to their respective cache misses. Crypto processing unit 360 may be configured to generate its own load and store requests independent of LSU 350, and MMU 320 may be configured to generate memory requests while executing a page table walk. Other types of off-core access requests are possible and contemplated. In the illustrated embodiment, crossbar interface 370 may be configured to provide a centralized interface to the port of crossbar 220 associated with a particular core 210, on behalf of the various functional units that may generate accesses that traverse crossbar 220. In one embodiment, crossbar interface 370 may be configured to maintain queues of pending crossbar requests and to arbitrate among pending requests to determine which request or requests may be conveyed to crossbar 220 during a given execution cycle. For example, crossbar interface 370 may implement a least-recently-used or other algorithm to arbitrate among crossbar requestors. In one embodiment, crossbar interface 370 may also be configured to receive data returned via crossbar 110, such as from L3 cache 230 or I/O interface 250, and to direct such data to the appropriate functional unit (e.g., data cache 352 for a data cache fill due to miss). In other embodiments, data returning from crossbar 220 may be processed externally to crossbar interface 370.

During the course of operation of some embodiments of core 210, exceptional events may occur. For example, an instruction from a given thread that is picked for execution by pick unit 316 may be not be a valid instruction for the ISA implemented by core 210 (e.g., the instruction may have an illegal opcode), a floating-point instruction may produce a result that requires further processing in software, MMU 320 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 380 may be configured to manage the handling of such events. For example, TLU 380 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 380 may be configured to flush all instructions from the trapping thread from any stage of processing within core 210, without disrupting the execution of other, non-trapping threads. In some embodiments, when a specific instruction from a given thread causes a trap (as opposed to a trap-causing condition independent of instruction execution, such as a hardware interrupt request), TLU 380 may implement such traps as precise traps. That is, TLU 380 may ensure that all instructions from the given thread that occur before the trapping instruction (in program order) complete and update architectural state, while no instructions from the given thread that occur after the trapping instruction (in program order) complete or update architectural state.

Managing Branch Prediction

As described above in regard to FIG. 3, core 210, upon the detection of a branch in program instructions, predict which path of the branch is most likely and begin to fetch instructions for the predicted path. If, however, when the conditional of the branch is evaluated and it does not match the predicted path, i.e., a misprediction, the previously fetched instructions are flushed, and new fetch operations are initiated. This may, in some embodiments, result in a decrease in performance compared to cases where no prediction is performed, as well as additional power consumption.

Figure 4:
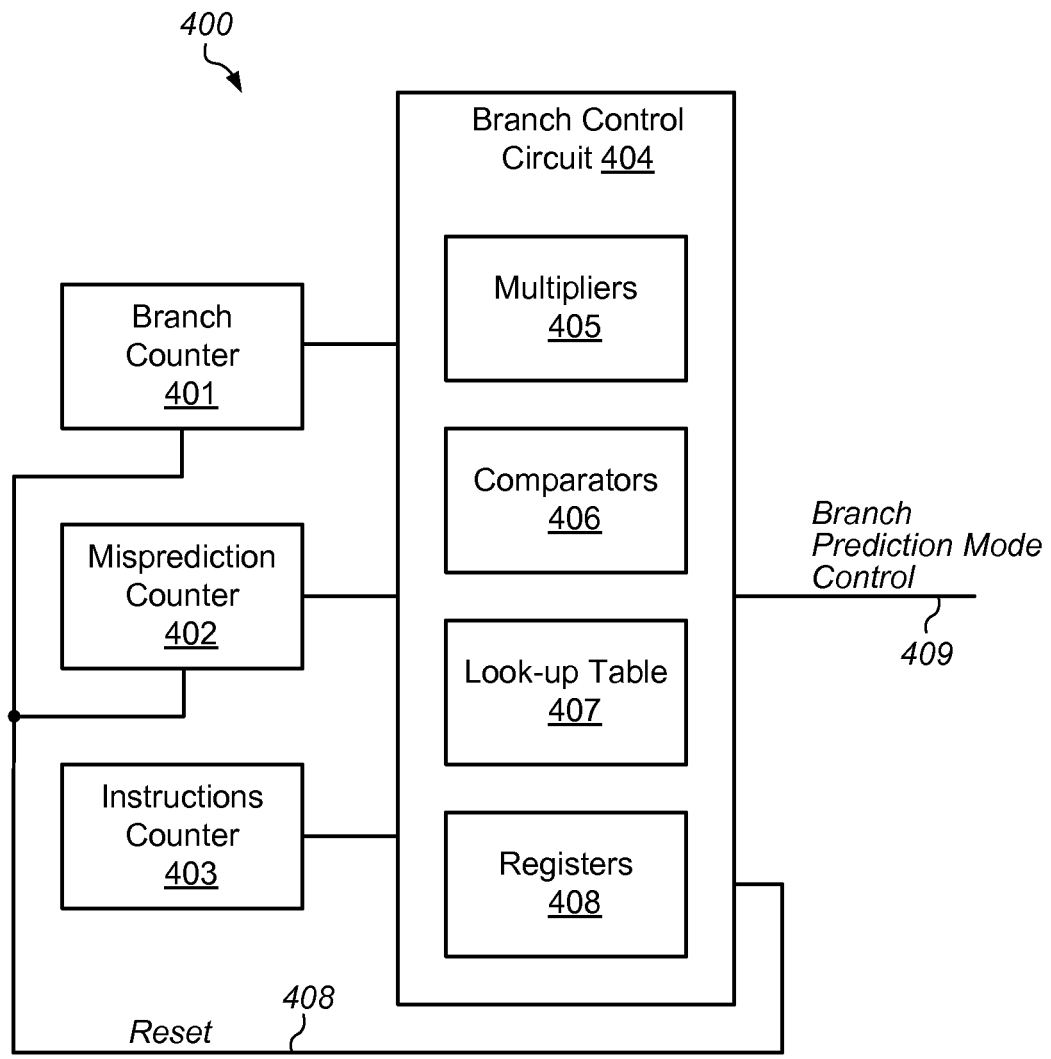
FIG. 4 is a block diagram of an embodiment of branch prediction enable logic.

Turning to FIG. 4, a block diagram of an embodiment of branch prediction enable logic is illustrated. In the illustrated embodiment, branch prediction enable logic 400 includes branch counter 401, misprediction counter 402, instruction counter 403, and branch control circuit 404. In some embodiments, branch counter 401, misprediction counter 402, and instruction counter 403 may correspond to counters 315, and branch control circuit 404 may correspond to branch control circuitry 316.

Branch counter 401 may be configured to increment in response to the fetching of a branch instruction, and misprediction counter 402 may be configured to increment in response to the determination that a branch has been incorrectly predicted. Instruction counter 403 may be configured to increment each time an instruction is fetched. All three of the aforementioned counters may be further configured to reset (also referred to herein as "clear") in response to reset 408 generated by branch control circuit 404. As will be described in more detail in regard to branch control circuit 404, reset 408 may depend on the value of instruction counter 403 and a threshold number of instructions.

Branch control circuit 404 may include various functional blocks. In the illustrated embodiment, branch control circuit 404 includes multipliers 405, comparators 406, look-up table 407, and registers 408. It is noted, however, branch control circuit 404 may, in other embodiments, include different functional blocks or different configurations of functional blocks.

Multipliers 405 may be configured to multiply a value from branch counter 401 by a misprediction ratio value to generate a misprediction threshold value. In some embodiments, the misprediction ratio value may be stored in registers 408. The misprediction ratio value may be stored upon boot of a computing system or may be programmed during operation of the computer system dependent upon processing or power requirements, or other suitable parameter. Multipliers 405 may be implemented in accordance with one of various multiplication architectures, such as, Wallace Tree, or any other suitable architecture.

Comparators 406 may be configured to compare a value of misprediction counter 402 to the generated misprediction threshold. Additionally, comparators 406 may compare a value of instruction counter 403 to an instruction count threshold value. In some embodiments, the instruction threshold value may be stored in registers 408 or any other suitable location. The instruction count threshold value may be initially stored in registers 408 upon boot of the computing system or may, in other embodiments, be programmed during operation of the computer system dependent upon one or more computer system parameters, such as, power requirements, for example. Comparators 406 may also be configured to compare a value of branch counter 401 to a branch threshold value. As with the instruction threshold value, the branch threshold value may be stored in registers 408 upon boot of the computer system or may be programmed during operation. Comparators 406 may be implemented in accordance with one of various design styles. For example, comparators 406 may employ multiple exclusive-OR gates to perform a bitwise comparison between two binary values.

Look-up table 407 may be configured to store multiple misprediction threshold values. A value of branch counter 401 may be used as an index into look-up table 407 to select a single one of the stored multiple misprediction threshold values. In some embodiments, the multiple misprediction threshold values may be stored upon boot of the computer system. The stored misprediction threshold values may, in other embodiments, be adjusted during operation of the computing system dependent upon one or more system parameters, such as, processing performance, for example. Look-up table 407 may be implemented as a Static Random Access Memory (SRAM) or any other suitable storage circuit.

Branch control circuit 404 may also include additional logic circuits (not shown) to generate reset 408 and branch prediction mode control 409. As described in more detail below, in regard to FIG. 8 and FIG. 9, branch control circuit 404 may enable or disable a branch prediction mode in a processor through branch prediction mode control 409 dependent upon the a comparison between a value of misprediction counter 402 and the generated (or selected) misprediction threshold value, as well as, a value of branch counter 401 and the stored branch threshold value. In some embodiments, branch control circuit 404 may detect one or more operational modes of a processor, such as, e.g., multi-threaded mode, and whether to enable or disable the branch prediction mode may further depend on the detection operation mode.

Reset 408 may be asserted dependent upon the comparison between a value of instruction counter 403 and the instruction threshold value. In some embodiments, when the value of instruction counter 403 is greater than the instruction threshold value, reset 408 may be asserted, thereby resetting branch counter 401, misprediction counter 402, and instruction counter 401. The generation (or selection) of the misprediction threshold value, as well as the evaluation of branch prediction mode control 409, may also be dependent the aforementioned comparison between the value of instruction counter 403 and the instruction threshold value. It is noted that although a comparison between the value of instruction counter 401 and the instruction threshold value, in other embodiments, a timer or other suitable counter circuit may be employed to track a period of time, such that when the period of time has elapsed, the evaluation of branch prediction mode control 409 is performed. By re-evaluating branch prediction mode control 409 each time the time period has elapsed (or a suitable number of instructions have been fetched), branch prediction mode can be enabled or disabled during operation of the computer system dependent upon the accuracy of branch predictions and other suitable performance metrics.

It is noted that the embodiment illustrated in FIG. 4 is merely an example. In other embodiments, different numbers of counters, and different processing of counter values are possible and contemplated.

In some embodiments, however, if the rate of branch misprediction is determined to be above a predetermined threshold, branch prediction may be disabled so as to prevent instructions fetches down a predicted branch. By doing so, a processor may, in some embodiments, save power and improve processing performance.

Figure 5:
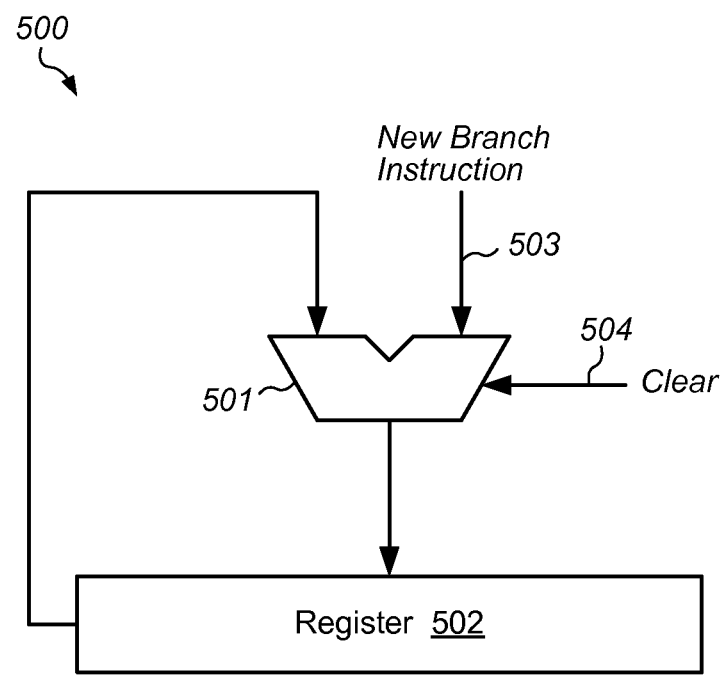
FIG. 5 illustrates an embodiment of a branch counter.

Turning to FIG. 5, an embodiment of a new branch instruction counter is illustrated. In some embodiments, branch instruction counter 500 may correspond to one of branch counter 401 as illustrated in FIG. 4. Branch instruction counter 500 includes register 502 and adder 501. Register 502 may include multiple latches, flip-flops, or any other suitable storage circuit. Adder 501 may be configured to add one to the contents of register 502 responsive to the assertion of new branch instruction signal 503. Adder 501 may be designed according to one of various design styles, and may include multiple static complementary metal-oxide semiconductor (CMOS) logic gates.

During operation, when a branch instruction is retrieved from memory, new branch instruction signal 503 may be asserted. In response to the assertion of new branch instruction signal 503, adder 501 may add one, or any other suitable number, to a value currently stored in register 502. The resultant sum from adder 501 may then be stored in register 502.

When clear signal 504 is asserted, adder 501 may output a value of all zeros, which may be subsequently stored in register 502, thereby setting branch instruction counter 500 to zero. Although the embodiment of branch instruction counter 500 is depicted as being reset to zero in response to the assertion of clear signal 504, in other embodiments, any suitable reset value may be employed.

It is noted that the embodiment illustrated in FIG. 5 is merely an example. In other embodiments, different functional blocks and different configurations of functional blocks are possible and contemplated.

Figure 6:
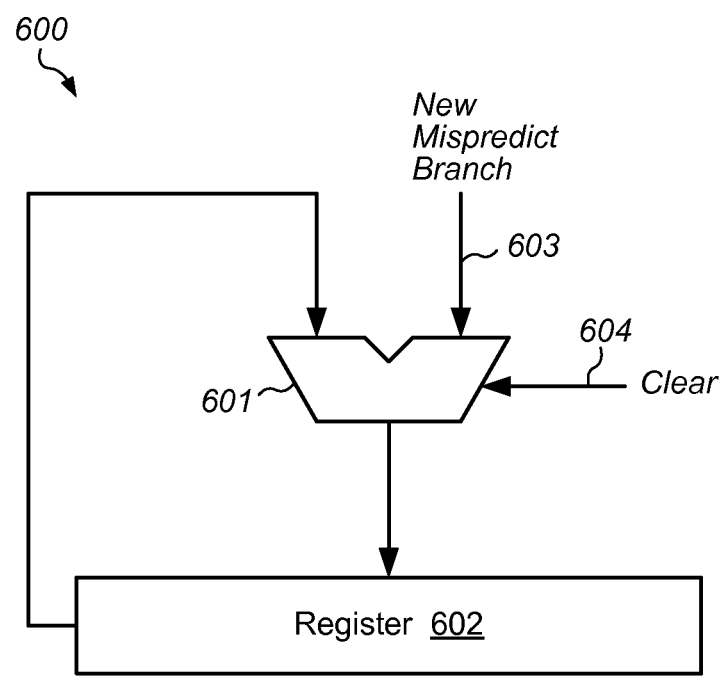
FIG. 6 illustrates an embodiment of a branch misprediction counter.

An embodiment of a counter for tracking a number of branch mispredictions is illustrated in FIG. 6. In some embodiments, branch misprediction counter 600 may correspond to misprediction counter 402 as illustrated in FIG. 4. Branch misprediction counter 600 includes register 602 and adder 601. Register 602 may include multiple latches, flip-flops, or any other suitable storage circuit. Adder 601 may be configured to add one to the contents of register 601 responsive to the assertion of new mispredict branch signal 603. Adder 601 may be designed according to one of various design styles, and may include multiple CMOS logic gates.

During operation, when a branch is mispredicted, new branch mispredict signal 603 may be asserted. Adder 601, in response to the assertion of branch mispredict signal 603, may add one, or any other suitable number, to the current contents of register 602. The resultant sum from adder 601 may then be stored in register 602.

When clear signal 604 is asserted, adder 601 may output a value of all zeros, which may be subsequently stored in register 602, thereby setting branch mispredict counter 600 to zero. Although the embodiment of branch instruction counter 600 is depicted as being reset to zero in response to the assertion of clear signal 604, in other embodiments, any suitable reset value may be employed.

It is noted that the embodiment illustrated in FIG. 6 is merely an example. In other embodiments, different counter circuit implementations may be employed.

Figure 7:
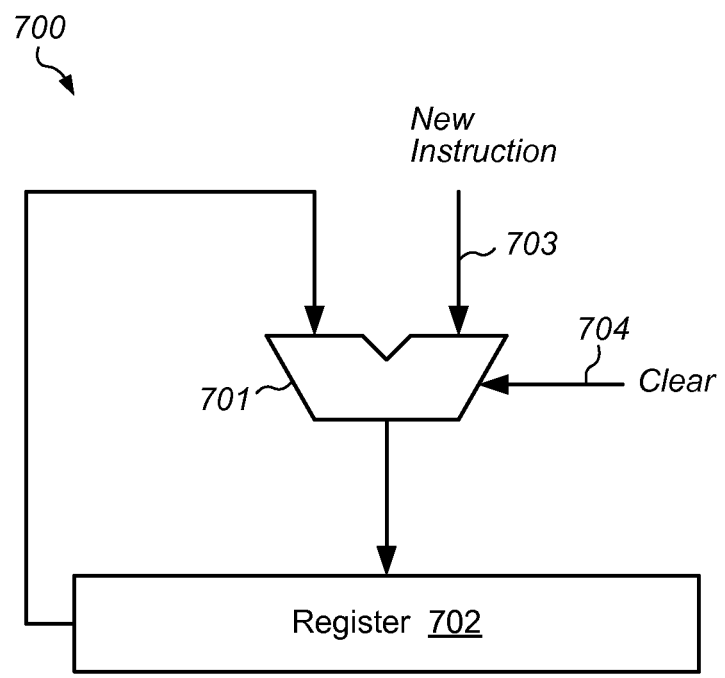
FIG. 7 illustrates an embodiment of a new instruction counter.

Turning to FIG. 7, an embodiment of a new instruction counter is illustrated. In some embodiments, new instruction counter 700 may correspond to instruction counter 401 as illustrated in FIG. 4. New instruction counter 700 includes register 702 and adder 701. Registers 702 may include multiple latches, flip-flops, or any other suitable storage circuit. Adder 701 may be configured to add one to the contents of register 702 responsive to the assertion of new instruction signal 703. In various embodiments, adders 701 may be designed according to one of numerous design styles, and may include multiple CMOS logic gates.

During operation, when a new instruction is retrieved from memory, new instruction signal 703 may be asserted. In response to the assertion of new instruction signal 703, adder 701 may add one, or any other suitable number, to a value currently stored in register 702. The resultant sum from adder 701 may then be stored in register 702.

When clear signal 704 is asserted, adder 701 may output a value of all zeros, which may be subsequently stored in register 702, thereby setting branch instruction counter 700 to zero. Although the embodiment of branch instruction counter 700 is depicted as being reset to zero in response to the assertion of clear signal 704, in other embodiments, any suitable reset value may be employed.

It is noted that the embodiment illustrated in FIG. 7 is merely an example. In other embodiments, different counter circuits and different counter operation are possible and contemplated.

Figure 8:
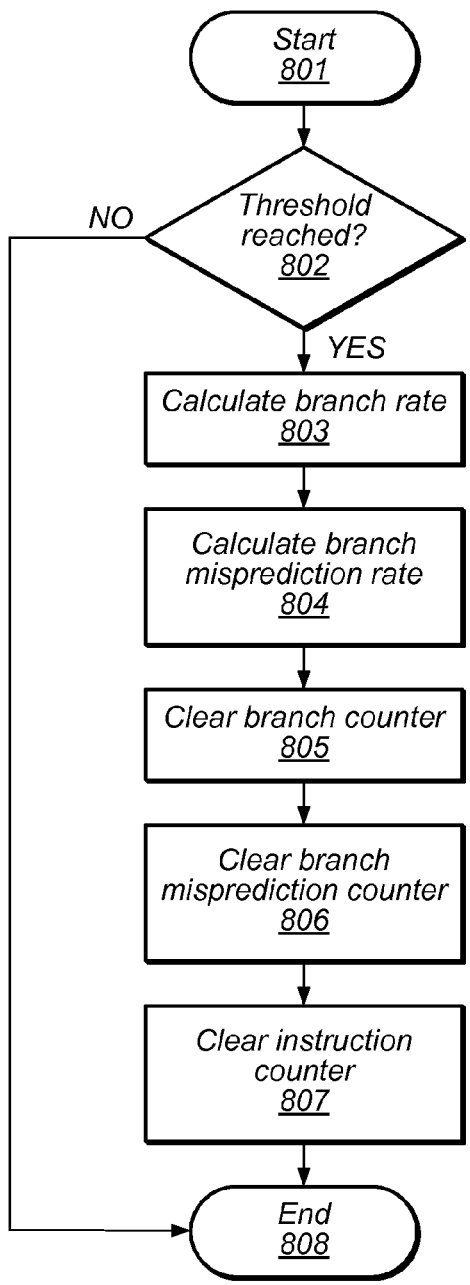
FIG. 8 illustrates a flowchart depicting an embodiment of a method for determining branch rate and branch misprediction rate.

Turning to FIG. 8, a flowchart depicting an embodiment of a method for calculating branch misprediction rate is illustrated. The method begins in block 801. The method then may depend on a threshold value (block 802). In some embodiments, a counter, such as instruction counter 403 of FIG. 4, may be incremented in response to the fetching of an instruction. The value of the counter may then be compared against a predetermined threshold value using a comparator or any other suitable circuit. The predetermined threshold value may, in various embodiments, be programmable. In other embodiments, elapsed time may be tracked by a timer or other suitable timekeeping circuit, and compared against a time threshold value.

When the number of instructions is less than or equal to the predetermined threshold, the method may conclude in block 808. If, however, the number of instructions is greater than the predetermined threshold, the branch rate may then be calculated (block 803). In various embodiments, a counter, such as, e.g., counter 500 as illustrated in FIG. 5, may be incremented in response to each new branch instruction. The counter may be incremented over a predetermined number of instructions before being reset, and the value of the counter over this number of instructions may be used to determine a rate at which branches are occurring. By using the number of fetched instructions to determine the branch rate, the use of complicated or high power consumption circuits, such as, a divider circuit, may be eliminated. As described above, a period of time may, in other embodiments, be employed to determine the rate at which branches are occurring.

Once the branch rate is calculated, a rate of branch misprediction and a misprediction threshold value may then be determined (block 804). A misprediction counter may be incremented in response to each incorrect branch prediction. The value of the misprediction counter may then be used directly as the rate of branch misprediction. In other embodiments, the value of the misprediction counter may be divided by a time period in order to determine the rate of misprediction. A value of the branch counter may be multiplied by a predetermined misprediction ratio to determine the misprediction threshold value. The resultant misprediction threshold value may then be compared with a value from the misprediction branch counter as described below in regard to FIG. 9. It is noted that while a multiplier is described, in other embodiments, a look-up table based methodology may be employed where the value of the branch instruction counter may be used to index into the look-up table to retrieve the misprediction rate threshold value.

With the completion of the calculation of the branch misprediction rate, the branch counter may then be reset (block 805). Additionally, the branch misprediction counter may be reset (block 806). Once the branch counter and the branch misprediction counter are reset, the instruction counter may be reset (block 807). The method may then conclude in block 808. In some embodiments, once the method has concluded, a determination may then be made to disable branch prediction dependent upon the determined branch rate and the calculated branch misprediction rate as described below in regard to FIG. 9.

It is noted that the method illustrated in FIG. 8 is merely an example. In other embodiments, different operations, and different orders of operation are possible and contemplated.

Figure 9:
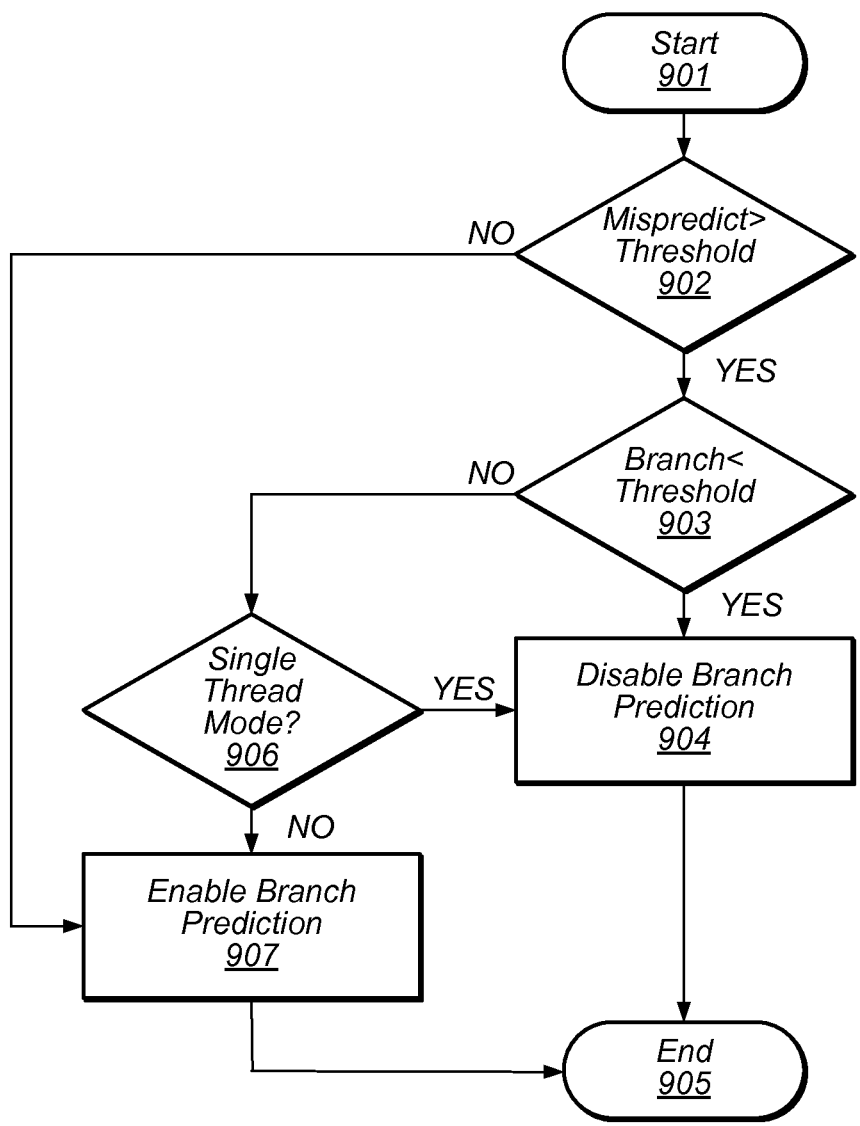
FIG. 9 illustrated a flowchart depicting an embodiment of a method for selectively enabling branch prediction.

Turning to FIG. 9, an embodiment of a method for selectively disabling branch prediction is depicted in the illustrated flowchart. Referring collectively to FIG. 3 and the flowchart of FIG. 9, the method begins in block 901. The method may then depend on a determined misprediction rate (block 902). In some embodiments, the misprediction rate may be determined using the method depicted in the flowchart of FIG. 8. It is noted that prior to performing the method of FIG. 9, branch prediction may be in either state, i.e., enabled or disabled. The method may allow a change in whether or not branch prediction is enabled, or may leave branch prediction in its previous state. Moreover, the method depicted in FIG. 9 may be repeatedly performed after a predetermined number of instructions have been fetched.

When the misprediction rate is less than or equal to a predetermined threshold value, the branch prediction may be enabled (block 907). The predetermined threshold value may, in various embodiments, be programmable. With branch prediction enabled, IFU 310 may, upon the detection of a branch within program instructions, determine which direction of the branch is most likely, and fetch new instructions accordingly. Once branch prediction has been enabled, the method may conclude in block 905.

When the misprediction rate is greater than the predetermined threshold value, the method may then depend on the branch rate (block 903). When the branch rate is less than a branch rate predetermined threshold value, branch prediction may be disabled (block 904). The branch rate predetermined threshold value may, in various embodiments, be programmable and the value set according to one or more system parameters, such as, e.g., processing load, power requirements, and the like. When branch prediction is disabled, IFU 310 may still perform a prediction of which branch is most likely when a conditional is encountered in the program instructions, however, IFU 310 may not fetch instructions along the predicted branch. The Branch History Table may continue to be updated even though branch prediction has been disabled. In some embodiments, the contents of the Branch History Table may be employed to determine when to re-enable branch prediction. Once branch prediction has been disabled, the method may conclude in block 905.

When the branch rate is greater than or equal to the predetermined branch rate threshold, the method may then depend on an operating mode of the processor, such as, core 210, for example (block 906). When the processor or core is operating in a single-thread mode, the method may proceed as described above from block 904, and when the processor or core is operating in a multi-threaded mode, the method may proceed as described above from block 907. By enabling and disabling branch prediction mode as described above, the energy-efficiency of a computing system may, in some embodiments, be improved. That is, power consumption of the computing system may be reduced while preserving or improving performance.

The operations of the method illustrated in the flowchart of FIG. 9 are depicted as being performed in a sequential fashion. In other embodiments, one or more of the operations may be performed in parallel.

Figure 10:
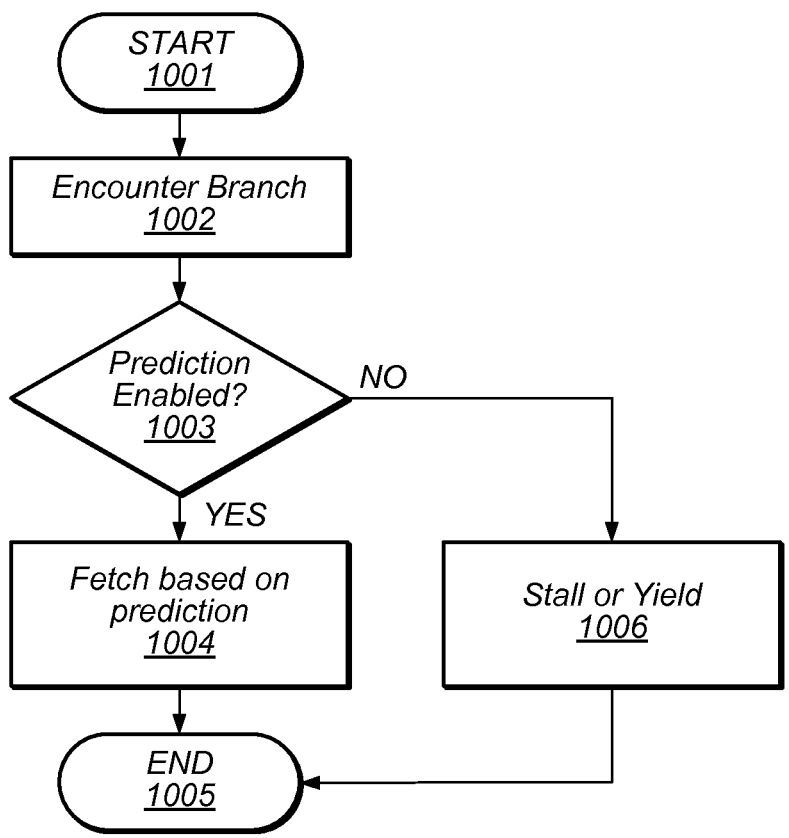
FIG. 10 illustrates a flowchart depicting an embodiment of a method for operating a processor.

Turning to FIG. 10, a flowchart depicting an embodiment of operating a processor is illustrated. Referring collectively to FIG. 3 and the flowchart of FIG. 10, the method begins in block 1001. During fetching of program instructions, a branch in the instructions may be detected (block 1002). In some embodiments, circuitry within IFU 310 of core 210 may determine if a conditional is present in a program instruction. Counters 315 may be incremented, and branch control circuit 316 may make a determination if branch prediction should be employed. In various embodiments, circuitry within IFU 310 may predict which branch is most likely and determine one or more instructions that belong to the predicted branch.

The method may then depend on whether branch prediction is enabled (block 1003). Branch prediction may, in various embodiments, be enabled or disabled using the embodiments of methods illustrated in FIG. 8 and FIG. 9. When branch prediction is enabled, a fetch is performed for previously determined instructions (block 1004). In some embodiments, IFU 310 may check instruction cache 314 for the desired instructions. If the desired instructions are unavailable in instruction cache 314, then IFU 310 may send a request to memory management unit 320 to retrieve the desired instructions from main memory. Once the instructions are fetched, the method may conclude in block 1005.

When branch prediction is not enabled, fetches may be stalled or the fetch slot yielded (block 1006). If core 210 is configured to execute a single thread, fetches for the thread may be stalled until the conditional is resolved and the correct branch can be identified. At that point, fetches may resume along the determined branch. In the case were core 210 is configured to allow multiple execution threads, the fetch slots for a thread encounter a branch may be yielded to another execution thread pending the resolution of the conditional. Once the conditional resolves, and the correct branch determined, fetches for the thread that encountered the branch may resume. The method may then conclude in block 905.

It is noted that the method illustrated in FIG. 10 is merely an example. In other embodiments, different operations, and different orders of operations are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
a fetch unit configured to speculatively fetch instructions of a predicted branch in response to a determination that a branch prediction mode has been enabled;
a control circuit configured to:
determine, in response to a determination that a specified number of instructions have been fetched, a branch rate value indicative of a number of branch instructions included in the specified number of instructions;
determine a branch misprediction rate value indicative of a number of mispredicted branch instructions included in the number of branch instructions;
retrieve a misprediction ratio, wherein a value of the misprediction ratio is based on a power consumption requirement of the processor;
multiply the number of branch instructions by the misprediction ratio to generate a first threshold value;
enable the branch prediction mode based on a comparison between the branch misprediction rate value and the first threshold value; and
disable the branch prediction mode based on a comparison between the branch misprediction rate value and the first threshold value and based on a comparison between the branch rate value and a second threshold value.

2. The processor of claim 1, wherein the control circuit is further configured to:
enable the branch prediction mode based on a determination that the processor is operating in a multi-thread mode; and
disable the branch prediction mode based on a determination that the processor is operating in a single thread mode.

3. The processor of claim 2, further comprising circuitry configured to:
stall execution in response to a determination that branch prediction mode is disabled and the determination that the processor is operating in the single thread mode; and
reallocate a fetch slot for a first execution thread to a second execution thread in response to the determination the branch prediction mode is disabled and the determination that the processor is operating in the multi-thread mode.

4. The processor of claim 1, further comprising:
a first counter configured to increment in response to a fetch of a branch instruction;
a second counter configured to increment in response to a determination that a branch has been mispredicted; and
a third counter configured to increment in response to an instruction being fetched and reset in response to a determination that a value of the third counter is greater than a third threshold value;
wherein the first counter is further configured to reset in response to a determination that the value of the third counter is greater than the third threshold value; and
wherein the second counter is further configured to reset in response to a determination that the value of the third counter is greater than the third threshold value.

5. The processor of claim 4, wherein the control circuit is further configured to retrieve the first threshold value from a look-up table dependent upon a value of the first counter.

6. A method for operating a processor, the method comprising:
determining, in response to a determination that a specified number of instructions have been fetched, a branch rate value indicative of a number of branch instructions included in the specified number of instructions;
determining a branch misprediction rate value indicative of a number of mispredicted branch instructions included in the number of branch instructions;
retrieving a misprediction ratio, wherein a value of the misprediction ratio is based on a power consumption requirement of the processor;
multiplying the number of branch instructions by the misprediction ratio to generate a first threshold value;
enabling a branch prediction mode based on comparing the branch misprediction rate value and the first threshold value; and
disabling the branch prediction mode based on comparing the branch rate value and a second threshold value and based on a comparing the branch misprediction rate value and the first threshold value.

7. The method of claim 6, further comprising:
predicting an outcome of a conditional included in a fetched branch instruction in response to a determination that the branch prediction mode is disabled; and
performing an instruction fetch dependent upon whether or not the branch prediction mode is enabled and the outcome.

8. The method of claim 6, further comprising:
enabling the branch prediction mode based on determining that the processor is operating in a multi-thread mode; and
disabling the branch prediction mode based on determining that the processor is operating in a single thread mode.

9. The method of claim 6, further comprising:
incrementing a first counter in response to a fetch of a branch instruction;
incrementing a second counter in response to a determination that a branch has been mispredicted;
incrementing a third counter in response to an instruction being fetched; and
resetting the first counter, the second counter, and the third counter in response to a determination that a value of the third counter is greater than a third threshold value.

10. The method of claim 9, further comprising retrieving the first threshold value from a look-up table dependent upon a value of the first counter.

11. The method of claim 9, wherein enabling the branch prediction mode comprises comparing the first threshold value to a value of the second counter, and disabling the branch prediction mode comprises comparing the first threshold value to the value of the second counter.

12. The method of claim 9, wherein determining the branch rate value comprises comparing a value of the first counter to a predetermined branch count threshold.

13. A system, comprising:
a memory; and
a plurality of processors, wherein each processor of the plurality of processors is configured to:
determine a branch rate value each time a predetermined number of instructions have been fetched, wherein the branch rate value is indicative of a number of branch instructions fetched in the predetermined number of instructions;

determine a branch misprediction rate value indicative of a number of mispredicted branch instructions included in the number of branch instructions;

retrieve a misprediction ratio, wherein a value of the misprediction ratio is based on a power consumption requirement of the processor;

multiply the number of branch instructions by the misprediction ratio to generate a first threshold value;

enable a branch prediction mode based on a comparison between the branch misprediction rate value and the first threshold value; and disable the branch prediction mode based on a comparison between the branch misprediction rate value and the first threshold value and based upon a comparison between the branch rate value and a second threshold value.

14. The system of claim 13, wherein each processor of the plurality of processors is further configured to:

predict an outcome of a conditional included in a fetched branch instruction in response to a determination that the branch prediction mode is disabled; and perform an instruction fetch dependent upon whether or not branch prediction mode is enable and the outcome.

15. The system of claim 13, wherein each processor of the plurality of processors is further configured to:

enable the branch prediction mode based on a determination that the processor is operating in a multi-thread mode; and disable the branch prediction mode based on a determination that the processor is operating in a single thread mode.

16. The system of claim 13, wherein each processor of the plurality of processors includes:

a first counter configured to increment in response to a fetch of a branch instruction; and a second counter configured to increment in response to a determination that a branch has been mispredicted; and a third counter configured to increment in response to an instruction being fetched and reset in response to a determination that a value of the third counter is greater than a third threshold value;

wherein the first counter is further configured to reset in response to a determination that the value of the third counter is greater than the third threshold value; and wherein the second counter is further configured to reset in response to a determination that the value of the third counter is greater than the third threshold value.

17. The system of claim 16, wherein to enable the branch prediction mode, each processor of the plurality of processors is further configured to compare the first threshold value to a value of the second counter, and wherein to disable the branch prediction mode, each processor of the plurality of processors is further configured to compare the first threshold value to the value of the second counter.

* * * * *

UNITED STATES PATENT AND TRADEMARK OFFICE
CERTIFICATE OF CORRECTION

PATENT NO. : 10,001,998 B2
APPLICATION NO. : 14/256347
DATED : June 19, 2018
INVENTOR(S) : Zhang et al.

Page 1 of 1

It is certified that error appears in the above-identified patent and that said Letters Patent is hereby corrected as shown below:

In the Specification

In Column 1, Line 61, delete "that that" and insert -- that --, therefor.

In Column 1, Line 66, delete "that that" and insert -- that --, therefor.

In Column 14, Line 36, delete "the a" and insert -- the --, therefor.

Signed and Sealed this
Fifth Day of February, 2019

Andrei Iancu
*Director of the United States Patent and Trademark Office*